Dec. 4, 1928.
C. B. FRANKLIN
1,693,696
GENERATOR ASSEMBLY FOR MOTOR CYCLE ENGINES
Filed March 6, 1926    2 Sheets-Sheet 1
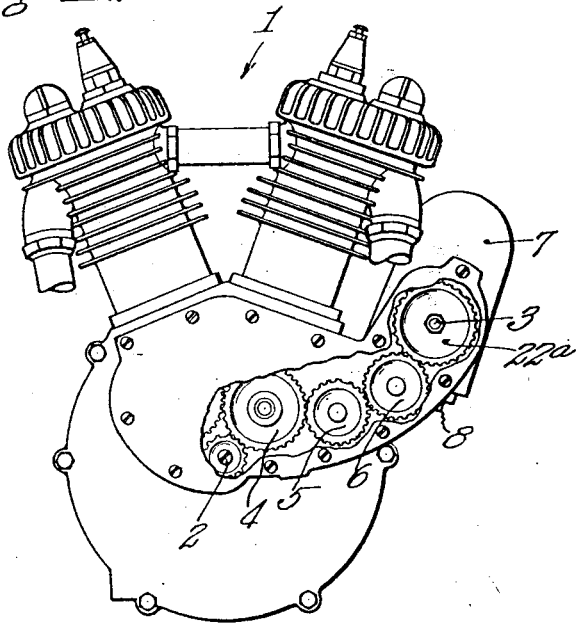
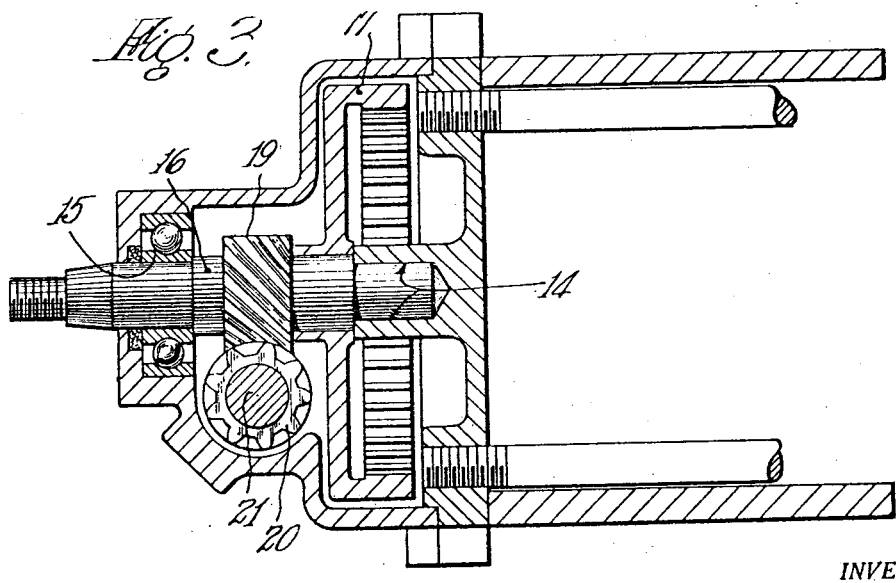
INVENTOR.
Charles B. Franklin
BY Chapin + Neal
ATTORNEYS.

Dec. 4. 1928.                                                          1,693,696
                          C. B. FRANKLIN
             GENERATOR ASSEMBLY FOR MOTOR CYCLE ENGINES
                   Filed March 6, 1926            2 Sheets-Sheet 2
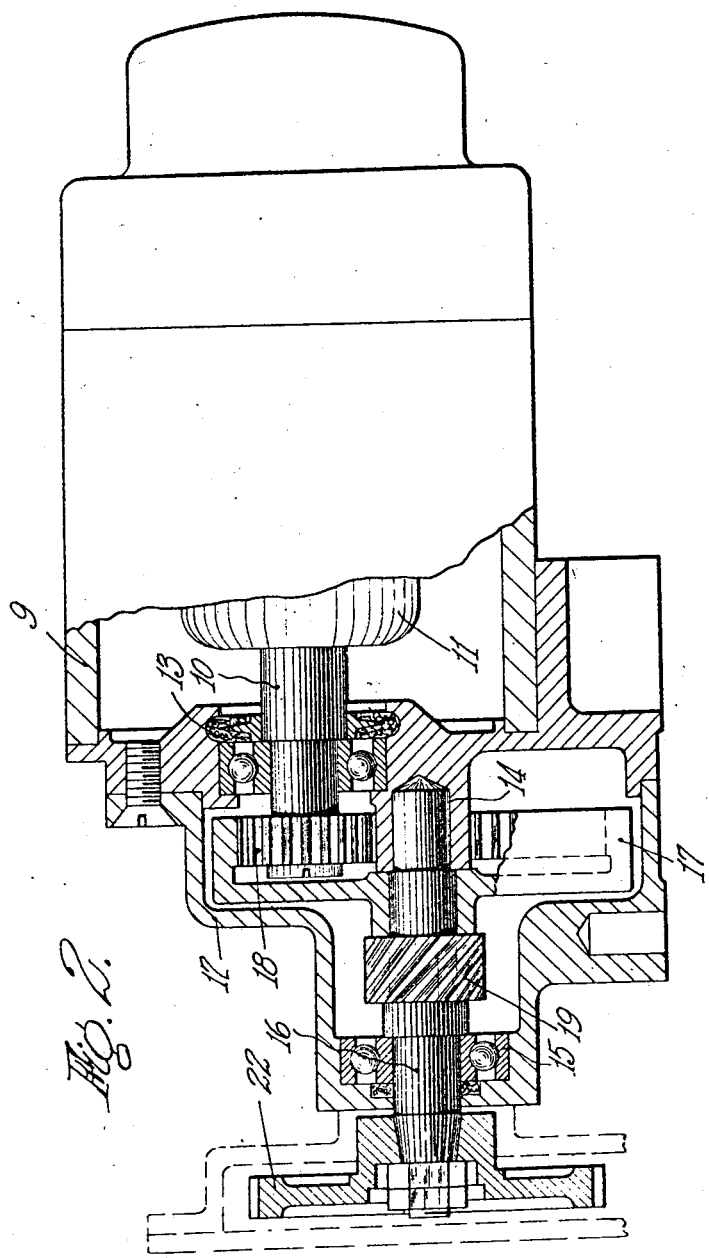
INVENTOR.
Charles B. Franklin
BY Chapin & Neal
ATTORNEYS.

Patented Dec. 4, 1928.

1,693,696

UNITED STATES PATENT OFFICE.

CHARLES B. FRANKLIN, OF SPRINGFIELD, MASSACHUSETTS, ASSIGNOR TO INDIAN MOTORCYCLE COMPANY, A CORPORATION OF MASSACHUSETTS.

GENERATOR ASSEMBLY FOR MOTOR-CYCLE ENGINES.

Application filed March 6, 1926. Serial No. 92,825.

This invention relates to an electrical generating and distributing system for internal combustion engines and more particularly to the provision of means in connection with a motorcycle engine for interchangeably employing magneto or generator and battery ignition.

It has been customary practice with motorcycle engines equipped with magneto ignition to operate the magneto shaft from the engine through a train of gears permanently mounted on some part of the engine frame. In a four cycle engine so equipped, the magneto shaft is necessarily rotated at one-half engine speed. Likewise, a distributor when used with battery ignition would have its distributor shaft rotated at one half engine speed. A generator on the other hand, when employed in connection with battery ignition, must have its armature shaft rotated at higher speed than engine speed for effective operation. Accordingly a generator can not be operated successfully from the same train of gearing ordinarily employed to drive the magneto and the alternate use of such equipment or replacement of one for the other is usually attended with the expense and difficulty of providing a separate train of gearing for each separate form of installation.

It is to make such an exchange of equipment possible with a minimum of labor and expense and more especially to avoid any necessity of changing the train of gearing from the engine shaft that forms one of the prime objects of the present invention.

For the accomplishment of this object, the invention in its present embodiment contemplates the adaptation to the standard construction of a motorcycle engine having magneto ignition of a special form of generator assembly which may replace the magneto upon the same bracket or mounting of the latter and designed for operation through the same permanent train of gearing as for the magneto, all without any further change or alteration of other parts. To this end also, the generator assembly is designed with an especial view to its compactness for occupying small space and ruggedness of construction for withstanding the hard usage incident to motorcycle operation.

For the accomplishment of these and other objects as will presently appear, the present invention comprises the features of construction and arrangement of parts hereinafter more particularly described and pointed out in the appended claim.

In the drawings:

Fig. 1 is a motorcycle engine of a two cylinder four cycle type showing in a cut away portion of the view a train of gears from the engine shaft to a magneto or generator shaft;

Fig. 2 is a view in longitudinal section of the generator assembly; and

Fig. 3 is a fragmentary, longitudinal section of the generator assembly taken at right angles to Fig. 2.

Referring more particularly to Fig. 1 of the drawings, a standard type of a two cylinder engine more especially adapted for motorcycles is shown. The engine as a whole is indicated at 1 with its motor shaft at 2 in driving connection with a driven shaft 3 through a train of intermediate gears 4, 5 and 6. The driven shaft 3, in the view illustrated, is the direct operating shaft of a magneto enclosed within the casing 7. It will be understood that this magneto is detachably mounted on a bracket (not shown) of the engine frame by bolts 8. As will be hereinafter described, a generator assembly of approximately the same size as casing 7 may be mounted in place of the magneto and on the same bracket and a shaft for operating the armature shaft of the generator will be in the same position as shaft 3. The intermediate gears 4, 5 and 6 serve as idlers for the transmission of power and are permanently mounted in suitable bearings upon the frame of the engine. The intermediate gear 4 in the usual construction is employed as a cam gear for the valve operation of the engine. The ratio between the gear on shaft 2 and gear on shaft 3 obviously determines the driving speed of the latter with respect to the former, and in the embodiment shown, this ratio is one to two so that the shaft 3 rotates at one half the speed of the engine shaft 2. Such a speed ratio is required for the usual magneto operation and the gears, as shown, are suited to this need.

Referring to Fig. 2, I will now describe the preferred form of generator assembly which is designed for interchangeability with that of the magneto on the engine just described. This assembly comprises a cylindrical housing 9 within which is mounted an armature shaft 10 having its armature 11, said shaft being carried in bearings one at the right (not shown) and one at the left at 13. The bearing 13 is provided in a gear case 12 which serves as a closure for one end of the housing 9. The gear case 12 has mounted therein on suitable bearings 14 and 15, a countershaft 16 which has fixed to one end thereof a large internal gear 17 in mesh with a small pinion 18 fixed to the armature shaft 10. The countershaft 16 extends exteriorly of the gear casing and has fixed on its outer end a gear 22 for receiving driving power. Also fixed on the countershaft 16 is a small pinion 19 which may serve to drive through pinion 20 a distributor shaft 21 at the same speed of rotation as said shaft 16.

The gears 17 and 18 form a step-up gearing arrangement between countershaft 16 and armature shaft 10 whereby the latter is rotated approximately three times as fast as the former, and by virtue of employing the internal gear 17 for meshing with and driving the enclosed pinion 18, it is possible to locate the parallel shafts 10 and 16 closely adjacent to one another and thus provide a very compact structure taking up small space.

In Fig. 1, the shaft 3 is that of a magneto enclosed within a casing 7 and the gear 22ª thereon may be identical with the gear 22 shown on countershaft 16 in Fig. 2. For replacing this magneto with a generator as shown in Fig. 2, the generator is designed as a unitary assembly and so as to be mounted on the same brackets as that of the magneto and with its countershaft 16 assuming the same position as that of shaft 3 of the magneto. The gear 22 of said generator being identical with gear 22ª (the same gear may be employed in either installation if desired) will thus receive power from the same train of gears 4, 5 and 6 without any further alteration of parts. The purpose and function of the step-up gearing in the generator assembly are now apparent for since in the embodiment of the invention shown the countershaft 16 is rotated from the motor shaft at one half engine speed, the step-up gearing will cause the armature shaft of the generator to rotate for instance, at one and one half engine speed, which is generally fast enough for efficient operation of such generators. The distributor shaft 21 may, however, be driven at one half engine speed by direct operation from the countershaft 16, as shown.

The advantages of the arrangement described will be obvious both as regards compactness in construction, the simplicity of parts and the ease by which the change of equipment may be effected. The invention, however, is not to be confined to the exact arrangement shown, for obviously various slight changes in detail and equivalent rearrangements may be resorted to within the purview and scope of the following claim.

What I claim is:

In an electrical generating and distributing system for internal combustion engines of the type wherein a train of gearing is provided to enable said engine shaft to rotate a driven shaft at a slower speed than said engine shaft, the combination therewith of a generator assembly comprising a housing having contained therein an armature and its shaft, said slow speed driven shaft for operation by said engine shaft, and step-up gearing between said driven shaft and said armature shaft to rotate the latter at higher speed than said engine shaft, said step-up gearing comprising a relatively large internal gear on said driven shaft and a relatively small intermeshing pinion on said armature shaft, said driven shaft extending exteriorly of said housing and having fixed thereto a gear for meshing with said train of gearing from said engine shaft, a pinion fixed on said driven shaft adjacent said internal gear within said housing and a distributor shaft extending to within said housing and having a gear for operation by said pinion.

In testimony whereof I have affixed my signature.

CHARLES B. FRANKLIN.

CERTIFICATE OF CORRECTION.

Patent No. 1,693,696.                  Granted December 4, 1928, to

CHARLES B. FRANKLIN.

It is hereby certified that the name of the assignee in the above numbered patent was erroneously written and printed as "Indian Motorcycle Company", whereas said name should have been written and printed as "Indian Motocycle Company", as shown by the records of assignments in this office; and that the said Letters Patent should be read with this correction therein that the same may conform to the record of the case in the Patent Office.

Signed and sealed this 22nd day of January, A. D. 1929.

(Seal)                                            M. J. Moore,
                                                         Acting Commissioner of Patents.